United States Patent [19]

Adams et al.

[11] 4,279,391

[45] Jul. 21, 1981

[54] DESENSITIZING HELICOPTER CONTROL RESPONSE TO INADVERTENT PILOT INPUTS

[75] Inventors: Don L. Adams, Fairfield; Richard D. Murphy; William C. Fischer, both of Monroe, all of Conn.

[73] Assignee: United Technologies Corporation, Hartford, Conn.

[21] Appl. No.: 6,314

[22] Filed: Jan. 24, 1979

[51] Int. Cl.³ .............................................. B64C 11/44
[52] U.S. Cl. .................................. 244/17.13; 244/178
[58] Field of Search ................ 244/17.13, 83 D, 83 E, 244/83 F, 83 G, 83 H, 83 J, 179, 182, 178, 197, 220, 221, 228; 318/584, 585, 586; 364/434

[56] References Cited

U.S. PATENT DOCUMENTS

| | | | |
|---|---|---|---|
| 3,528,633 | 9/1970 | Knemeyer | 244/17.13 X |
| 3,584,814 | 6/1971 | Murphy | 244/178 |
| 3,711,042 | 1/1973 | Rempfer et al. | 244/17.13 X |
| 3,733,039 | 5/1973 | O'Connor et al. | 244/17.13 X |
| 3,752,420 | 8/1973 | Osder | 364/434 X |
| 3,920,966 | 11/1975 | Knemeyer et al. | 244/17.13 X |
| 4,127,245 | 11/1978 | Tefft et al. | 244/17.13 |

Primary Examiner—Harold Broome
Assistant Examiner—Reinhard J. Eisenzopf
Attorney, Agent, or Firm—M. P. Williams

[57] ABSTRACT

A helicopter having an automatic flight control system including an inner, stability loop is rendered less sensitive to short-term, inadvertent pilot inputs by applying a washed-out derivative of a stick position signal to the inner stability loop in a sense to countermand the pilot action. Using a washed-out signal countermands only short-term rapid stick motions, which may be induced by the pilot actively, but inadvertently, or inactively due to coupling between the pilot or the stick and motion of the fuselage, while permitting purposeful, long-term stick positions to have the full, intended effect.

2 Claims, 1 Drawing Figure

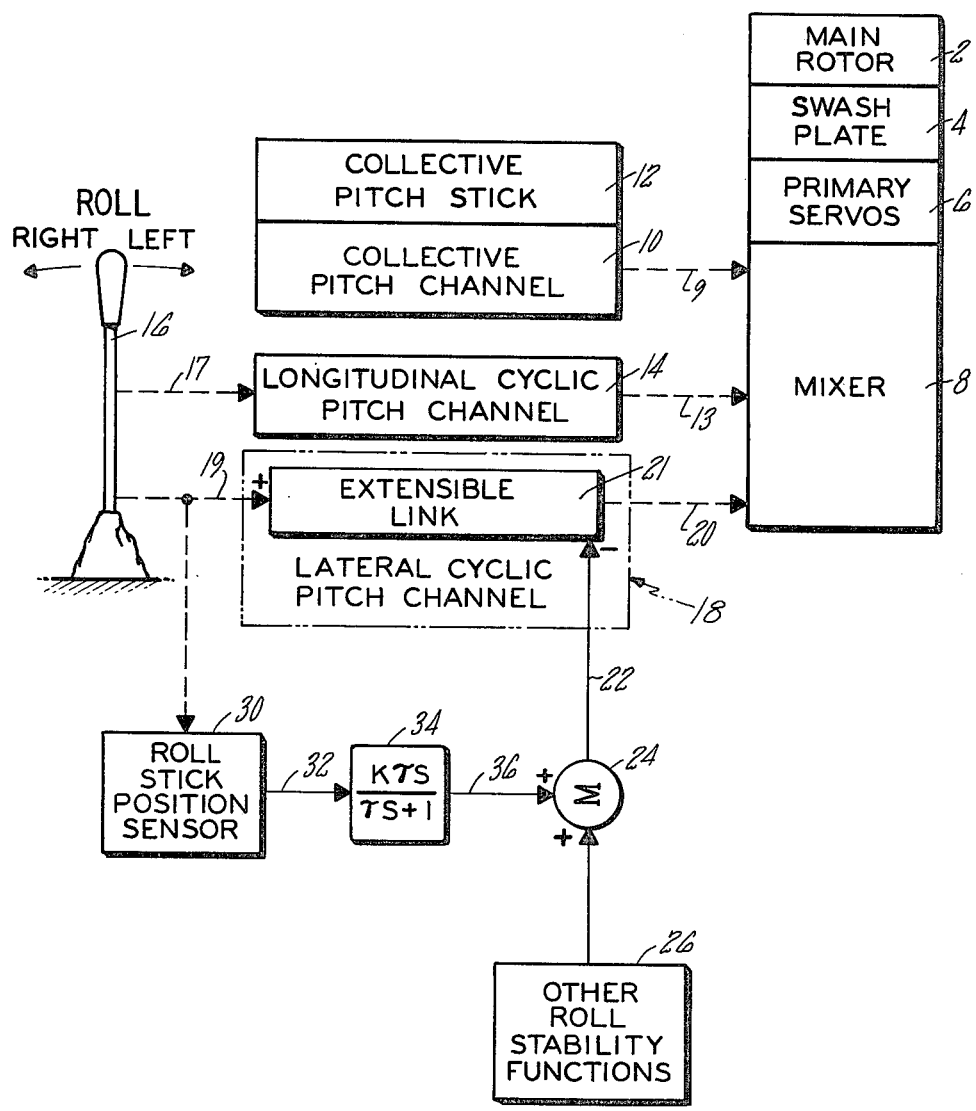

DESENSITIZING HELICOPTER CONTROL RESPONSE TO INADVERTENT PILOT INPUTS

BACKGROUND OF THE INVENTION

1. Field of Art

This invention relates to helicopters, and more particularly to apparatus for desensitizing the helicopter to short-term inadvertent pilot inputs.

2. Description of the Prior Art

A desirable characteristic of modern helicopters, particularly those used in ground-related operations, is high performance. This includes rapid, positive response to pilot input commands induced by the pilot through the control sticks. However, if the aircraft is highly responsive, any stick motion will cause a response, which in some cases is undesirable. For instance, the pilot may inadvertently produce a jerk in the stick which is immediately corrected. Similarly, if the aircraft is moved in one direction or the other rapidly, such as by a gust of wind or a rigid/elastic response mode of the helicopter, the pilot's inertia will cause him to resist the motion, thereby providing a momentary counterinput to the control stick. Also, since most helicopters have dual controls connected through the same mechanical linkage to the respective control channels, movement about the cockpit by one pilot could cause bumping of a stick inadvertently. In each of these instances (and others) a rapid short motion of the stick is normally immediately corrected by the pilot. Thus these unintentional inputs are of very short duration. However, they can be annoying and disruptive, particularly when close maneuvers are being employed and pilot workload is high. Also, these actions can cause response of the stability system in an undesired manner in some cases.

SUMMARY OF THE INVENTION

Objects of the invention include mitigation of short-term effects of unintentional pilot inputs through the control sticks of a helicopter.

According to the present invention, a signal indicative of the position of a helicopter control stick is passed through a washout filter and applied through the inner stability loop of the automatic flight control system (AFCS) of the helicopter to instantaneously countermand the signal, to the limited extent that the signal is able to pass through the washout filter.

The invention substantially reduces or eliminates aircraft motion as a consequence of short-term, inadvertent motions of the stick, while at the same time permitting full response to long-term, intentional repositioning of a control stick in the helicopter. The invention is readily implemented in a helicopter having an inner stability loop in an automatic flight control system, utilizing technology which is readily available in the art.

The foregoing and other objects, features and advantages of the present invention will become more apparent in the light of the following detailed description of an exemplary embodiment thereof, as illustrated in the accompanying drawing.

BRIEF DESCRIPTION OF THE DRAWING

The sole FIGURE herein is a simplified schematic block diagram of an exemplary embodiment of the present invention.

DETAILED DESCRIPTION

The cyclic and collective pitch of the blades of the main rotor 2 of a helicopter is controlled by a swash plate 4 in response to primary servos 6 as is known in the art. The primary servos 6 relate to the various controllable axes of the swash plate but are themselves controlled in response to the three pitch channels of the helicopter which are combined in a mixer 8, all as is known in the art. The mixer 8 is responsive through mechanical linkage 9 to a collective pitch channel 10, to which pilot inputs are provided through the collective pitch stick 12; it is also responsive through mechanical linkage 13 to a longitudinal cyclic pitch channel 14 to which the pilot can supply inputs through a cyclic pitch stick 16 connected thereto by mechanical linkage 17; and, a lateral cyclic pitch channel 18 is also responsive through mechanical linkage 19 to the cyclic pitch stick 16 to provide an input to the mixer 8 via mechanical linkage 20. Although only single sticks 12, 16 are illustrated, a helicopter will normally have dual controls connected through the same mechanical linkage (such as the linkage 17, 19).

As illustrated herein, the lateral cyclic pitch channel 18 is a simple channel, having a direct (unboosted) mechanical connection between the lateral axis of the cyclic pitch stick 16 and the mixer 8, but with a series automatic flight control system (AFCS) actuator connected into the linkage.

As an example, the actuator may comprise an extensible link 21, which may comprise an electrically actuated jack-screw type of extensible link. This is operated by a signal on a line 22 from a summing junction 24 that receives inputs, inter alia, from various roll stability function circuits 26. Alternatively, the extensible link 21 may be an hydraulic extensible link, in which case the signal on the line 22 may operate an electromechanical valve for controlling the extension of the link. In more complex systems, the lateral cyclic pitch channel 18 may include an auxiliary servo for amplfying the mechanical forces from the stick 16 before applying them to the mixer 8, as described in Tefft et al U.S. Pat. No. 4,127,245. In such case, the auxiliary servo may have a trim valve for an automatic flight control system as described in the Tefft et al patent. In some systems, the auxiliary servo may additionally have automatic flight control system valves which would receive roll stability commands (such as those provided on a line 22) directly into the auxiliary servo, thereby eliminating the need for the extensible link 21.

As is described in Tefft et al U.S. Pat. No. 4,213,584, the helicopter controls may generally be described as comprising an outer loop and an inner loop. The outer loop includes the control sticks themselves and mechanical connections thereto, as well as any automatic pilot control systems which can move the linkages and thus move the sticks. The outer loop control systems are generally rate limited, full authority systems. On the other hand, the inner loop control systems have limited authority but are very fast in their response. These systems add or subtract inputs to the control system made by the outer loop system, and do so in a fashion that does not move the control stick; thus the inner loop control systems are independent of the control stick and the mechanical connections immediately attached thereto. The outer loop system is utilized for gross maneuvering of the aircraft, on a long term basis, while the inner loop system is used for rapid correction of short term disturbances. Other than observation of aircraft response, the pilot is unaware of the inner loop inputs, but he can visually see or feel stick motions resulting from outer loop inputs by the automatic flight control system. In the simplified embodiment illustrated in the drawing, the stick 16 and the connection 17 comprise the roll outer loop, whereas the stick 16 and the connection 19 comprise the pitch outer loop. In a more general system of the type described in Tefft et al U.S. Pat. No. 4,127,245, the auxiliary servo and all of the inputs thereto which can affect motion of the connection with a stick (such as the connection 19 herein) comprise the outer loop. The inner loop in the simplified system illustrated in the drawing herein comprises the extensible link 21, the summing junction 24, and the other roll stability function circuits 26.

The control over main rotor blade pitch of a helicopter, and the variations therein, as described thus far are all well known in the art and form no part of the present invention.

In accordance with the invention, the linkage 19 is also connected to a roll stick position sensor 30, which may simply comprise a potentiometer connected to the linkage so as to provide a stick position signal on a line 32 to a washout filter 34, the output of which is a washed-out position signal on a line 36, applied to the summing junction 24. As a consequence of any motion of the stick 16, the sensor 30 will provide a change in the position signal on the line 32. The washout filter 34, as is known in the art, provides a lagged rate filter characteristic. This means that the more rapid the change in the signal on the line 32 the higher the initial output on the line 36; however, the output on the line 36 decays slowly in the absence of a rate input on the line 32, due to the characteristics of a washout filter. Thus, any rapid changes in stick motion are transmitted directly, but long-term, slow changes are not passed. Therefore, cancellation is limited to short duration, rapid changes.

As is known in the art, a washout filter may consist of an integrating amplifier (having capacitive and resistive feedback) with a series input capacitor; or, it may consist of a unitary gain amplifier (having only a resistive feedback) with series resistance and capacitance at its input. These filters are well known, and the time constants and gains thereof may be chosen during trial flight of a given type of aircraft with empirical adjustment to achieve the intended result. The time constant, $\tau$, will generally be a small fraction of a second (i.e., 10-200 ms); and the time constant in a pitch channel may be less than that of a roll channel. But these will vary from one type of helicopter to another.

The invention is implemented in the relatively high gain, fast response, inner stability loop since the corrective action to a short inadvertent motion of the stick must be effected in a very short period of time in order to be of any value. The exemplary embodiment shown in the drawing is with respect to the roll channel of a helicopter; it is particularly useful in the roll channel because the roll channel is more sensitive to inadvertent short motions of the stick, and it is more annoying, particularly during periods of heavy pilot workload, to have such inadvertent inputs in the roll axis. However, the invention is also useful in the pitch axis, as should be understood by those skilled in the art. The implementation in the pitch axis would be fully commensurate to that disclosed herein with respect to the roll axis. In a helicopter system employing digital AFCS components, such as that described in Murphy et al application FAIL-OPERATIONAL, FAIL-SAFE MULTI-COMPUTER CONTROL SYSTEM, Ser. No. 938,583, filed on Aug. 31, 1078, the output of the stick position sensor 30 may be digitized (either by use of an A/D converter of a conventional type, or by means of a transducer which provides an output in an inherent digital form). In such case, the filtering may be effected by means of a suitable filter algorithm program, selected from among those known in the art. The particular nature of the implementation is not germane to the invention, and it may be utilized in a wide variety of environments as well as being implemented by a wide variety of apparatus which is available in the art.

Similarly, although the invention has been shown and described with respect to an exemplary embodiment thereof, it should be understood by those skilled in the art that the foregoing and various other changes, omissions and additions may be made therein and thereto, without departing from the spirit and the scope of the invention.

Having thus described a typical embodiment of our invention, that which we claim as new and desire to secure by Letters Patent is:

1. A control system for a helicopter, comprising:
   a full authority outer control loop including mechanical connection to a control stick by means of which a pilot induces commands to the control surfaces of the helicopter;
   an inner, automatic stability loop for providing limited authority commands to the control surfaces of the helicopter independently of said mechanical connection and said control stick;
   means responsive to the position of said control stick for providing a stick position signal; and
   means including a washout filter responsive to said stick position signal for providing a short-term signal to said inner stability loop of magnitude and sense to provide a short-term command to the control surfaces of the helicopter which is substantially equal in magnitude and opposite in sense to an outer loop command represented by a change in control stick position indicated by said position signal so that pilot induced commands of a duration on the order of the time constant of said filter are substantially canceled by said inner loop.

2. A control system according to claim 1 wherein said washout filter has a time constant which is a small fraction of a second.

* * * * *